US006813967B2

(12) United States Patent
Andou

(10) Patent No.: US 6,813,967 B2
(45) Date of Patent: Nov. 9, 2004

(54) STARTER WITH DRIVING LEVER HAVING LEVER PIN

(75) Inventor: Shinji Andou, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/428,944

(22) Filed: May 5, 2003

(65) Prior Publication Data

US 2003/0192387 A1 Oct. 16, 2003

Related U.S. Application Data

(62) Division of application No. 09/983,035, filed on Oct. 22, 2001, now Pat. No. 6,612,191.

(30) Foreign Application Priority Data

Dec. 8, 2000 (JP) ....................................... 2000-374971
Dec. 15, 2000 (JP) ....................................... 2000-381264

(51) Int. Cl.[7] ................................................ F16J 15/02
(52) U.S. Cl. ............................ 74/7 A; 74/7 R; 277/630
(58) Field of Search .............................. 74/6, 7 A, 7 R; 277/630, 644, 647, 648, 649

(56) References Cited

U.S. PATENT DOCUMENTS 5,005,435 A 4/1991 Sugiyama
5,016,484 A 5/1991 Morikane
5,307,700 A 5/1994 Spellman et al.
5,473,956 A * 12/1995 Murata et al. ................ 74/7 E
5,895,993 A * 4/1999 Kajino et al. ................. 310/83
6,134,977 A 10/2000 Wessels
6,202,497 B1 * 3/2001 Kuragaki et al. ............. 74/7 A

FOREIGN PATENT DOCUMENTS

| | | |
|---|---|---|
| JP | U 62-82364 | 5/1987 |
| JP | 2-157479 | 6/1990 |
| JP | B2 2-60867 | 12/1990 |

* cited by examiner

*Primary Examiner*—David A. Bucci
*Assistant Examiner*—Colby Hansen
(74) *Attorney, Agent, or Firm*—Oliff & Berridge, PLC

(57) ABSTRACT

To reduce entire length and radial dimension of a starter, the starter includes a driving lever composed of a lever body and a lever pin as a pivot center of the driving lever body. Further, the lever pin is disposed close to a center case in the radial direction. The dimension between supporting positions of both arm portions supporting the lever pin is set large. To provide the waterproof structure of a starter, a projection provided on a lever seal is inserted into a positioning hole of a lever holder in a lever assembly of a starter. Further, a tip of the projection comes in contact with a peripheral surface of a lever pin at a lower side than the center of the lever pin.

3 Claims, 5 Drawing Sheets

STARTER WITH DRIVING LEVER HAVING LEVER PIN

CROSS-REFERENCE TO RELATED APPLICATION

This is a Division of Application Ser. No. 09/983,035 filed Oct. 22, 2001 now U.S. Pat. No. 6,612,191. The entire disclosure of the prior application is hereby incorporated by reference herein in its entirety.

This application is related to and claims priority from Japanese Patent Applications No. 2000-374971 filed on Dec. 8, 2000 and No. 2000-381264 filed on Dec. 15, 2000, the contents of which are hereby incorporated by reference.

BACKGROUND OF THE INVENTION

1. Field of the Invention

The present invention relates to a starter where a pinion is made to mesh with a ring gear of an internal combustion engine by displacing the pinion in its axial direction through a driving lever.

2. Description of Related Art

Recently, an intake pipe and a catalytic converter attached to an engine have been enlarged, or accessories and the, likes have been increased, due to social needs for environment (a fuel consumption regulation, an exhaust gas regulation and the like). Therefore, a mounting space of a starter has been reduced, and entire length of the starter is required to be reduced.

As shown in FIGS. 7A, 7B, it is proposed to reduce the entire length of a starter that a portion of a boss 110, which is a pivot center of a driving lever 100 driven by a magnet switch 130, and a center case 120 are lapped in an axial direction of the center case 120 (JP-Y-7-46772).

However, when the driving lever 100 is made of resin, the diameter of the boss 110 is required to be increased to some degree so as to ensure strength of the driving lever 100. As a result, distance "a" from the peripheral surface of the center case 120 to the center of the boss 110 is increased as shown in FIG. 7B, so that the distance L1 between two axes (distance between a motor shaft and an operation center of the magnet switch 130) is necessarily increased, and the starter is enlarged in the radial direction.

On the other hand, a starter is disclosed in JP-B-2-60867 as another prior art. As shown in FIG. 8, this starter includes an elastic member 210 attached to a lever holder 200. A projection 220 provided on the elastic member 210 is inserted into a hole 230 of the lever holder 200, and it is projected to the center of a driving lever 100. A gap between a boss 110 of the driving lever 100 and the lever holder 200 is reduced by the projection 220, so that it is intended that water is prevented from entering into a magnet switch.

In this prior art, however, since a minute gap is ensured between the tip of the projection 220 and the boss 110 of the driving lever 100, water cannot be surely prevented from entering into the side of the magnet switch, so that it is still likely that water enters into the magnet switch. In the above prior art, it is described that the projection is made to come in contact with the boss 110. In this case, however, when the driving lever 100 is pivoted so as to move like a see-saw, the projection 220 is separated from the boss 110 and hits the body of the driving lever 100. Thus, it is likely that the projection 220 disturbs the driving lever 100 from being pivoted.

SUMMARY OF THE INVENTION

In view of the above problems, it is a first object of the present invention to reduce entire axial length and a radial dimension in a starter where a pinion is made to mesh with a ring gear of an internal combustion engine by displacing the pinion in an axial direction through a driving lever.

It is a second object of the present invention to provide a waterproof structure which can reduce a possibility that water enters into a magnet switch without disturbing a driving lever from being pivoted.

In order to attain the first object, a starter according to the present invention includes a driving lever driven by a magnet switch and a pinion made to mesh with a ring gear of an internal combustion engine by displacing the pinion in its axial direction through the driving lever. In the starter, further, the driving lever includes a lever pin as a pivot center and a lever body for supporting both ends of the lever pin, and the lever pin is disposed outside a frame body, combined to a front housing, in a radial direction of the frame body.

Accordingly, the driving lever can be disposed while being displaced to a rear side in the axial direction of the starter by lapping the lever pin and the frame body in the axial direction, thereby reducing entire length of the starter by this displacement.

In a case that the lever pin is supported by the lever body, the diameter of the lever pin can be smaller than the outer diameter of a boss provided in the conventional resin-integrated driving lever, thereby reducing a radial dimension of the starter by this diameter difference.

In order to attain the second object, a starter according to the present invention includes a driving lever including a lever pin as a pivot center of the driving lever, a lever holder for rotatably supporting the lever pin and a rubber lever seal disposed between the lever holder and a magnet switch. In the starter, further, the lever seal includes a positioning projection, and the positioning projection passes through a positioning hole provided in the lever holder. The positioning projection protrudes to a side of the driving lever, and a tip of the positioning projection comes in contact with a peripheral surface of the lever pin at the lower side than the center of the lever pin.

Accordingly, no gap remains between the projection of the lever seal and the lever pin, so that water can be surely prevented from entering into the side of the magnet switch. Further, the tip of the projection comes in contact with the peripheral surface of the lever pin at the lower side than the center of the lever pin. Therefore, even when water hits the magnet switch from the lower side, the projection is not pushed up, and no gap remains between the lever pin and the projection, so that superior waterproof performance can be exhibited.

Furthermore, even when the driving lever is pivoted so as to move like a see-saw, the projection does not prevent the driving lever from being rotated, thereby not disturbing the pivoting of the driving lever.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

First Embodiment

A first embodiment of the present invention will be now described with reference to FIGS. 1–3.

Figure 1:
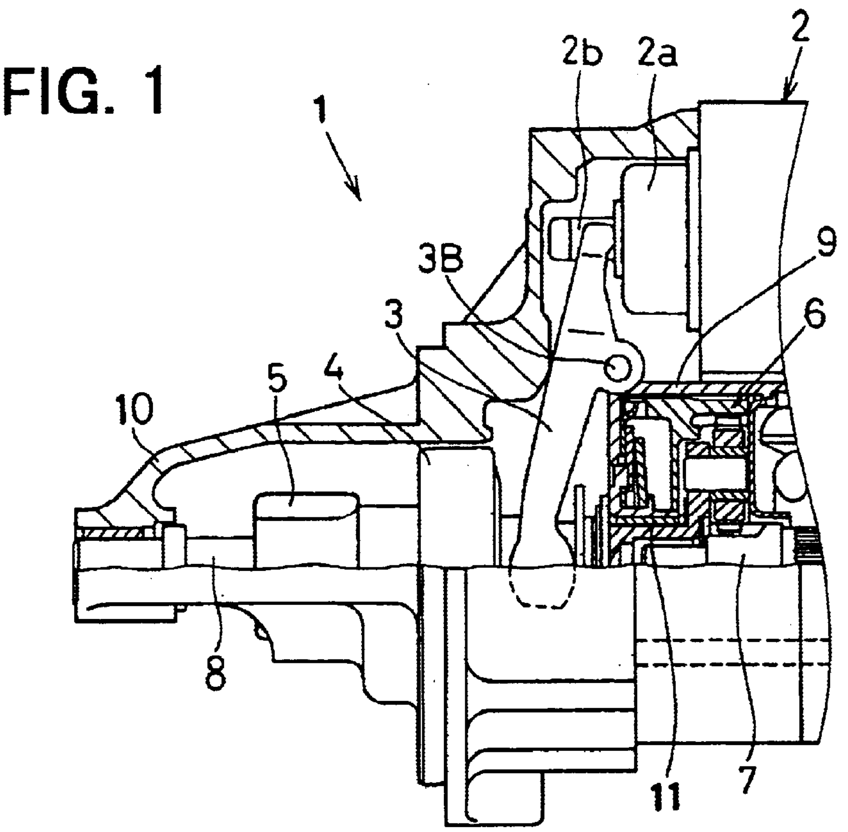
FIG. 1 is a fragmentary sectional view showing a starter according to a first embodiment of the present invention.

In a starter 1 in the first embodiment, as shown in FIG. 1, a driving lever 3 is coupled to a magnet switch 2 so that a pinion 5 together with a one-way clutch 4 is displaced in its axial direction to mesh with a ring gear (not shown) of an engine. In the starter 1, further, a rotary shaft 7 of a starting motor (not shown) and an output shaft 8 are disposed on the same axis through a speed reduction device 6. The one-way clutch 4 and the pinion 5 are provided on the output shaft 8.

The magnet switch 2 not only opens and closes a motor contact-breaker point shown as a small diameter end 2*b*, but also drives the driving lever 3 by displacing a contained plunger 2*a*.

The speed reduction device 6 is an epicycle reduction gear mechanism known well. The speed reduction device 6 reduces a revolution speed of the starting motor and transmits the reduced rotation to the output shaft 8.

The one-way clutch 4 is engaged onto the output shaft 8 using a helical spline so as to slide on the output shaft 8 in its axial direction.

The pinion 5 is integrated with an inner member (not shown) of the one-way clutch 4 to be rotated together with the inner member by the rotation transmitted from the output shaft 8 and to slide on the output shaft 8 in its axial direction together with the one-way clutch 4.

Figure 2A:
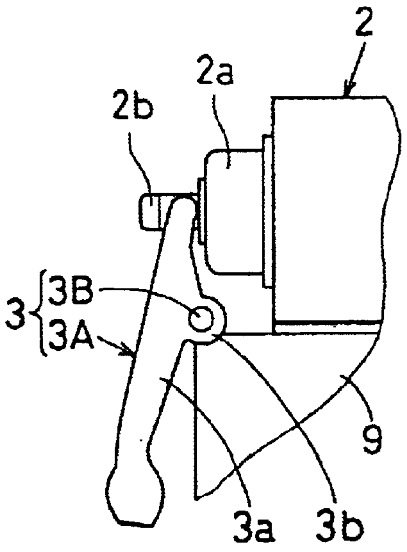
FIG. 2A is a side view showing an arrangement of a driving lever to a center case shown in FIG. 1.
Figure 2B:
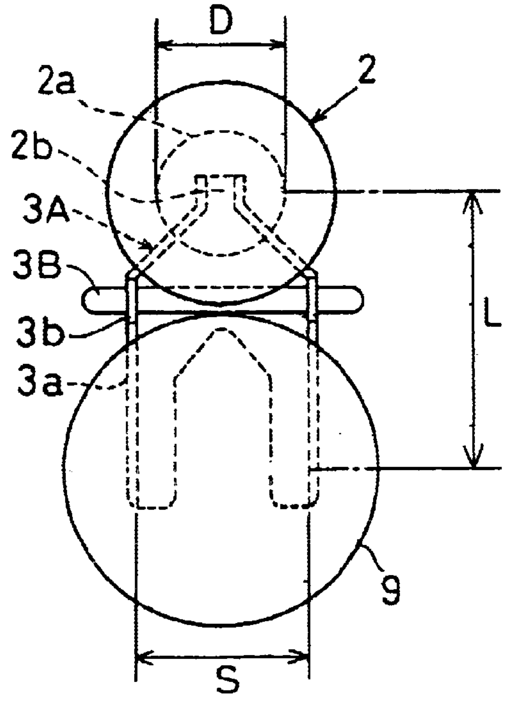
FIG. 2B is a front view showing the arrangement shown in FIG. 2A.

As shown in FIGS. 2A, 2B, for example, the driving lever 3 composed of a lever body 3A formed by bending an iron plate and a lever pin 3B held by the lever body 3A. The lever pin 3B is rotatably supported by a holder (not shown) so as to be a pivot center of the lever body 3A.

The lever body 3A includes a pair of side portions 3*a* facing each other at a predetermined gap therebetween. Each of the side portions 3*a* includes an arm portion 3*b* supporting the lever pin 3B. Each of the arm portions 3*b* has a circular hole through which the lever pin 3B passes. As shown in FIG. 2B, the dimension S between both arm portions 3*b* supporting the lever pin 3B is set larger than an outer diameter D of the plunger contained in the magnet switch 2.

The lever pin 3B is a metal round bar, for example. The lever pin 3B is made to pass through both circular holes of the arm portions 3*b*, and it is exposed between both arm portions 3*b*.

The driving lever 3 is disposed so that the lever pin 3B is disposed outside a center case 9 in its radial direction and is close to a peripheral surface of the center case 9 to a degree to nearly come in contact with the peripheral surface.

The center case 9 is a frame body for covering the speed reduction device 6. It is disposed between a front housing 10 and the starting motor. The center case 9 supports the output shaft 8 rotatably at a rear end through a bearing 11. The front housing 10 supports the output shaft 8 rotatably at a front end through a bearing (not shown).

When a key switch (not shown) is turned on and the magnet switch 2 is operated, the lever body 3A is turned about the lever pin 3B as a supporting point due to displacement of the plunger. The lever body 3A pushes the one-way clutch 4 coming in contact with the lower end of the lever body 3A in the axial direction. As a result, the one-way clutch 4, engaged onto the output shaft 8 using the helical spline, is pushed forward (in the left direction in FIG. 1). Then, the pinion 5 slides forward on the output shaft 8 together with the one-way clutch 4. Thus, the pinion 5 is made to mesh with a ring gear.

On the other hand, when the motor contact-breaker point is closed due to the displacement of the plunger, an armature of the starting motor is energized and starts to rotate. Rotation of the armature is transmitted to the output shaft 8 while it is reduced by the speed reduction device 6. The reduced rotation is transmitted from the output shaft 8 to the pinion 5 through the one-way clutch 4, thereby rotating the ring gear meshing with the pinion 5 and cranking.

When the key switch is turned off after the engine is started, the plunger of the magnet switch 2 returns to the stationary position, so that the one-way clutch 4 returns to the rear side on the output shaft 8 by the lever body 3A. Therefore, the pinion 5 is displaced to the rear side on the output shaft 8 together with the one-way clutch 4, and it is separated from the ring gear to return to a stationary position shown in FIG. 1. The motor contact-breaker point is opened due to the return of the plunger, so that energization of the armature is shut off and the rotation of the armature is stopped.

Operational Effect According to the First Embodiment

In the starter 1 according to the first embodiment, the lever pin 3B of the driving lever 3 is disposed outside the center case 9 in its radial direction. That is, since the lever pin 3B and the center case 9 are lapped in the axial direction of the center case 9, the driving lever 3 can be disposed while being displaced to the rear side (right direction in FIG. 1) in the axial direction than in a conventional starter. As a result, since the dimension between the one-way clutch 4 and the center case 9 can be reduced in the axial direction of the starter 1, the entire length of the starter 1 can be reduced by the reduced dimension.

Figure 7A:
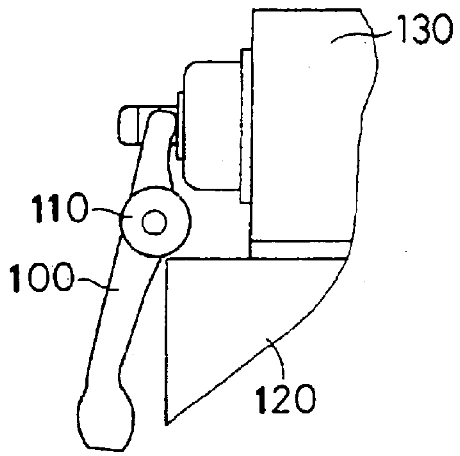
FIG. 7A PRIOR ART
FIG. 7A is a side view showing an arrangement of a driving lever to a center case in a prior art.
Figure 7B:
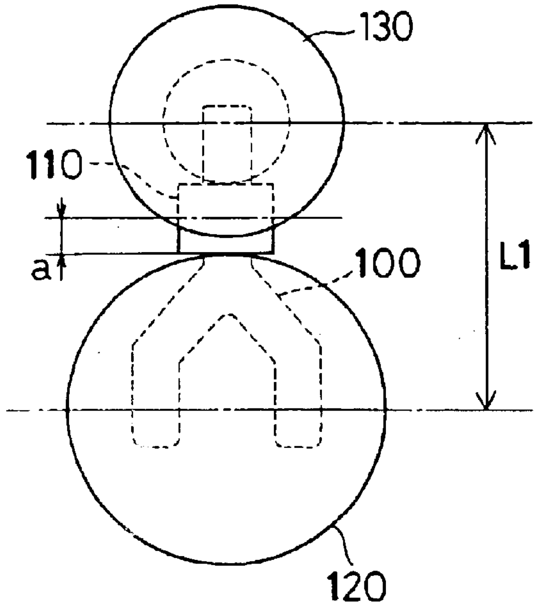
FIG. 7B PRIOR ART
FIG. 7B is a front view showing the arrangement shown in FIG. 7A.
Figure 8:
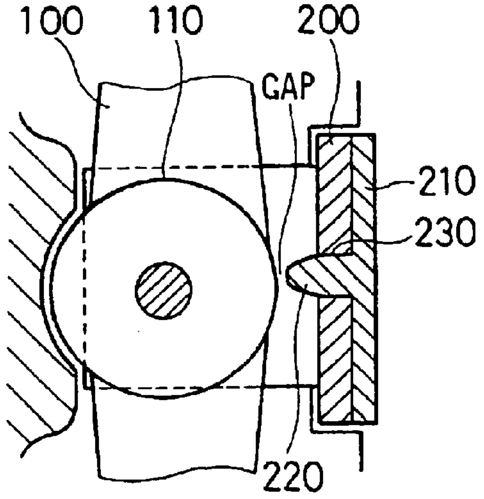
FIG. 8 PRIOR ART
FIG. 8 is a schematic view showing a waterproof structure around a boss of a driving lever in another prior art.

Since the driving lever is constructed so that the lever pin 3B is supported by the lever body 3A, the diameter of the lever pin 3B can be made to be smaller than the outer diameter of the boss provided in the conventional resin-integrated driving lever. Further, the dimension S between supporting positions, at which both arm portions 3*b* support the lever pin 3B, can be set larger (it can be set larger than the outer diameter D of the plunger in the first embodiment). Therefore, the lever pin 3B can be disposed close to the center case 9 nearly to a degree that the lever pin 3B comes in contact with the peripheral surface of the center case 9 while both arm portions 3*b* is not interfered with the center case 9. Accordingly, as shown in FIG. 2B, the dimension L between two axes (axis of the armature and the operation center of the magnet switch 2) can be smaller and the starter 1 can be miniaturized in the radial direction than in a case that the conventional resin-integrated driving lever is used (FIGS. 7A, 7B).

Figure 3A:
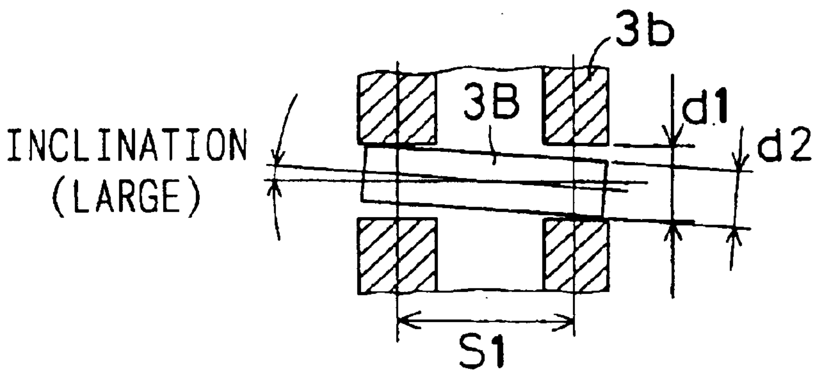
FIG. 3A is a schematic view showing a case of a small dimension between supporting points of a lever pin shown in FIG. 2B.
Figure 3B:
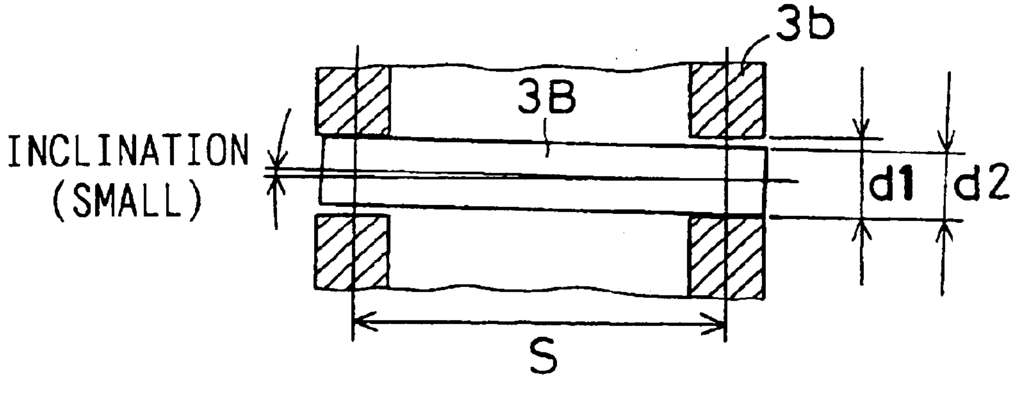
FIG. 3B is a schematic view showing a case of a large dimension between the supporting points of a lever pin shown in FIG. 2B.

As shown in FIG. 3A, when the dimension S1 between supporting points of both arm portions 3*b* is smaller in a case that the lever pin 3B is inclined due to a dimension difference between the inner diameter d1 of the circular hole of the arm portion 3*b* of the lever body 3A and the outer diameter d2 of the lever pin 3B (d1>d2), the lever pin 3B is more largely inclined. Therefore, an offset load is applied to the plunger and the one-way clutch 4 coming in contact with the lever body 3A, and an operation trouble (e.g., a slide trouble of the plunger) may be caused. In the first embodiment, however, as shown in FIG. 3B, this inclination of the lever pin 3B can be reduced by increasing the dimension S between the supporting positions of both arm portions 3*b* (larger than the outer diameter D of the plunger in the first embodiment), the operation trouble of the starter 1 can be prevented.

Second Embodiment

A second embodiment of the present invention will be now described with reference to FIGS. 4–6.

Figure 4:
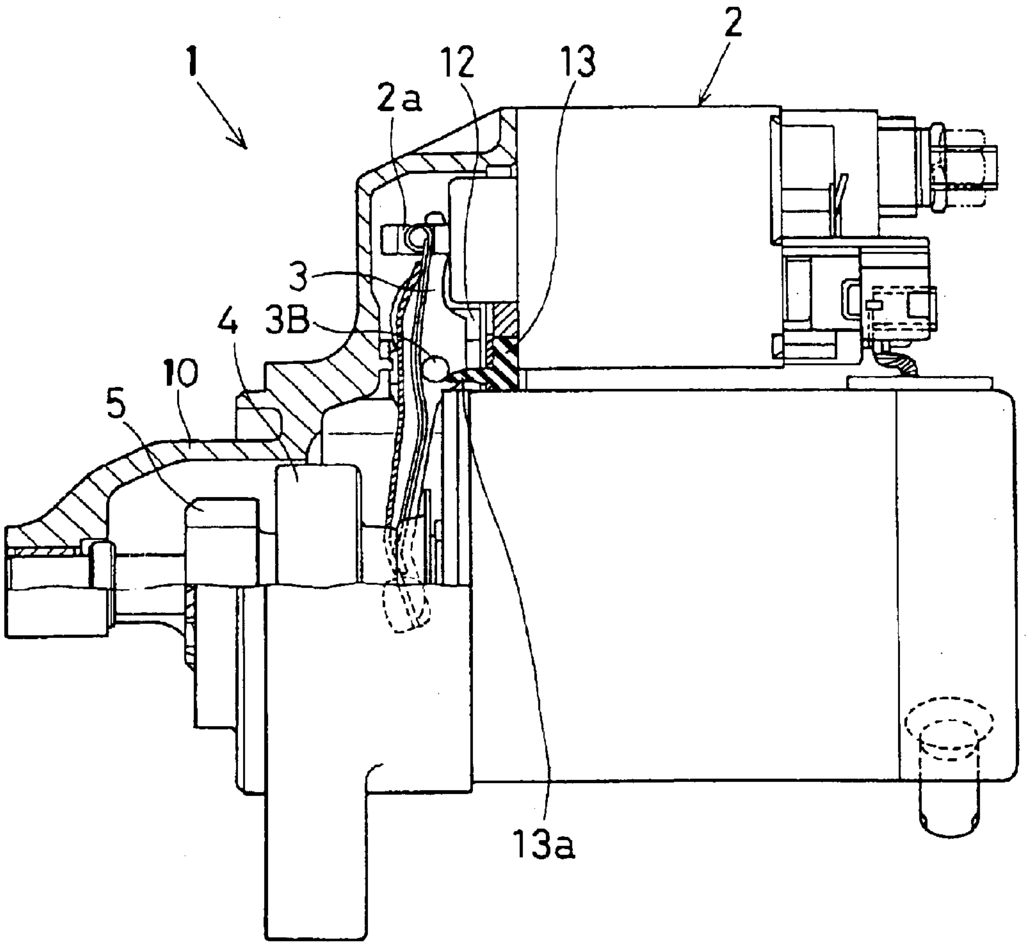
FIG. 4 is a fragmentary sectional view showing a starter according to a second embodiment of the present invention.

In a starter 1 according to the second embodiment, as shown in FIG. 4, a pinion 5 is made to mesh with a ring gear (not shown) of an internal combustion engine by displacing the pinion 5 integrally with an one-way clutch 4 in the axial direction through a driving lever 3 using operation force (magnetic force for attracting a contained plunger) of a magnet switch 2. The construction of the second embodiment except the lever assembly is similar to the first embodiment.

Figure 5:
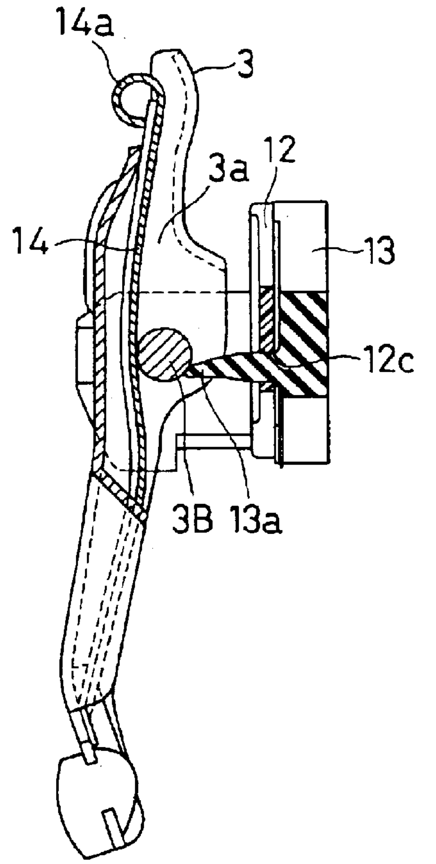
FIG. 5 is a fragmentary view showing a lever assembly in the second embodiment.
Figure 6:
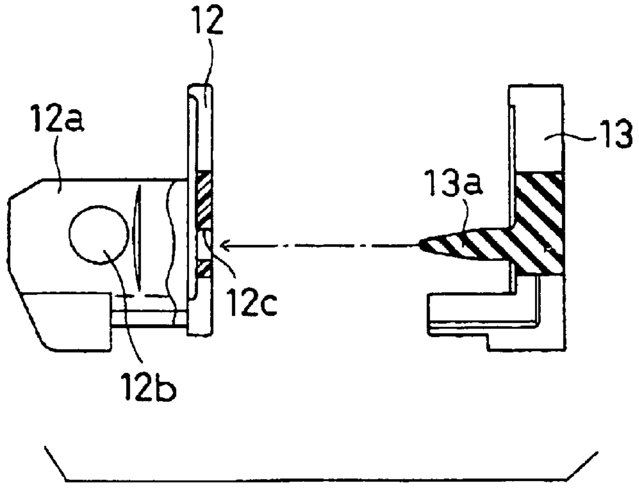
FIG. 6 is a side view showing a lever holder shown in FIG. 4.

As shown in FIG. 5, the lever assembly is composed of the driving lever 3, a lever pin 3B, a lever holder 12 and a lever seal 13. The driving lever 3 is formed by bending an iron plate, for example, and it includes a pair of side portions 3*a* for supporting the lever pin 3B and a plate spring 14 therein.

The plate spring 14 is a driving spring for giving flexibility to the driving lever 3. It includes a ring-shaped attachment portion 14*a* at its upper end. The attachment portion 14*a* is attached to a joint 2*a* provided on the plunger of the magnet switch 2. The lever pin 3B passes through circular holes provided on the pair of side portions 3*a* of the driving lever 3, and it is exposed between the pair of side portions 3*a*.

The lever holder 12 supports the driving lever 3 through the lever pin 3B, and it is attached to a front housing 10. As shown in FIG. 6, the lever holder 12, made of resin, for example, includes a pair of supporting plates 12*a* perpendicular to the lever pin 3B. A circular hole 12*b*, through which the lever pin 3B passes, is provided in each of the supporting plates 12*a*. The lever seal 13, made of rubber, is disposed between the lever holder 12 and the magnet switch 2, and it seals a space therebetween.

The lever seal 13 includes a projection 13*a* for positioning the lever seal 13 on the lever holder 12. The projection 13*a* is made to pass through a positioning hole 12*c* provided in the lever holder 12. The lever seal 13 is attached to the lever holder 12. The projection 13*a* has length in which the projection 13*a* can pass through the positioning hole 12*c* of the lever holder 12 to protrude to the side of the driving lever 3 and come in contact with a peripheral surface of the lever pin 3B. Further, the projection 13*a* is formed in a lingulate shape where its thickness in an up-down direction is gradually reduced toward its tip.

In the driving lever assembly, the lever pin 3B of the driving lever 3 passes through the circular holes 12*b* of the supporting plates 12*a*, and it is rotatably supported by the supporting plates 12*a*. Further, the tip of the projection 13*a* provided on the lever seal 13 comes in contact with the peripheral surface of the lever pin 3B at the lower side than its center as shown in FIG. 5. That is, a center of the positioning hole 12*c* in an up-down direction is located slightly lower than the center of the lever pin 3B, and the tip of the projection 13*a* of the lever seal 13, which passes through the positioning hole 12*c*, is located slightly lower than the center of the lever pin 3B. Therefore, the tip of the projection 13*a* necessarily comes in contact with the peripheral surface of the lever pin 3B at the lower side than its center.

Operational Effect According to the Second Embodiment

In the starter 1 in the second embodiment, the projection 13*a* of the lever seal 13 is extended to come in contact with the peripheral surface of the lever pin 3B, so that the projection 13*a* can hermetically seal a space between the lever pin 3B and the lever holder 12, thereby surely preventing water from entering in the side of the magnet switch 2. Further, the tip of the projection 13*a* comes in contact with the peripheral surface of the lever pin 3B at the lower side of the center of the lever pin 3B. Therefore, even when water hits the opening of the front housing 10, the projection is not pushed up, and waterproof performance can be ensured.

Furthermore, since the lever seal 13 is made of rubber, the projection 13*a* can be deformed to the lower side than the lever pin 3B, so that the projection 13*a* can be used as a drain valve. That is, when water enters into the inside (upper portion than the lever pin 3B) of the front housing 10, the projection 13*a* is deformed to the lower side than the lever pin 3B, so that the drain valve using the projection 13*a* is opened. Therefore, water entering into the inside of the front housing 10 can be readily drained.

Further, the driving lever 3 in the second embodiment is formed by bending an iron plate, for example, and the lever pin 3B is supported by the pair of side portions 3*a*. In this construction, since the lever pin 3B is exposed between the pair of side portions 3*a*, the projection 13*a* of the lever seal 13 can be readily made to come in contact with the lever pin 3B without being interfered with the driving lever body. As a result, even when the driving lever is pivoted so as to move like a see-saw, the projection 13*a* does not prevent the driving lever from being rotated, thereby not disturbing the pivoting of the driving lever 3.

Modification

Although the starter 1 in the above embodiments includes an epicycle reduction gear mechanism for reducing a revolution speed of the starting motor, the present invention can be applied to a starter including no speed reduction device 6. In this case, the lever pin 3B is disposed outside a yoke of the starting motor in its radial direction.

What is claimed is:

1. A starter comprising:

a housing;

a frame body disposed in the housing;

a magnet switch having a plunger having an outer diameter and an end having a diameter smaller than the outer diameter of the plunger, the end protruding from the plunger in an axial direction;

a driving lever driven by the magnet switch; and a pinion which is made to mesh with a ring gear of an internal combustion engine by displacing the pinion in its axial direction through the driving lever, wherein the driving lever includes a lever pin as a pivot center and a lever body for supporting both ends of the lever pin, wherein the lever pin is disposed outside the frame body in a radial direction of the frame body and laps with the frame body in an axial direction of the frame body, and wherein a distance between supporting positions of the lever body supporting the lever pin is larger than the outer diameter of the plunger contained in the magnet switch.

2. The starter according to claim 1, wherein the driving lever is made of a metal plate.

3. The starter according to claim 1, further comprising:

a starting motor for generating a rotation force;

an output shaft including the pinion thereon;

an epicycle reduction gear mechanism for reducing a revolution speed of the starting motor and transmitting the reduced rotation to the output shaft; and a center case for supporting the output shaft at a rear end, wherein the center case is combined as the frame body to the housing.

* * * * *